United States Patent Office 2,736,663
Patented Feb. 28, 1956

2,736,663

PRODUCTION OF NONALLERGEN REACTING PROTEIN COATINGS FROM ALLERGEN-CONTAINING POMACES

Harry M. Weber, Avon Lake, Ohio, assignor to The Sherwin-Williams Company, Cleveland, Ohio, a corporation of Ohio No Drawing. Application March 9, 1951,
Serial No. 214,834

8 Claims. (Cl. 106—154)

This invention relates as indicated to improved protein-containing compositions and an improved method for making the same from the pomace obtained in the solvent extraction of certain oils from the seed.

The production of paper coating materials from proteins and the use of proteins in paints is well known and a wide variety of processes for recovery and utilization of proteins from oil-bearing seeds have been developed. In most instances, these procedures have involved acid or alkali hydrolysis under controlled temperature and pH conditions followed by neutralization to an iso-electric point to precipitate the purified protein. This material was then taken up in aqueous alkali solution and mixed with an appropriate pigment slip, such as a clay slip, to produce a coating composition for paper, or an emulsion type paint. Special methods have been developed for mixtures of proteins, such as casein and soya bean protein. Although general references to castor bean protein may be found in the literature and prior art, this material has not attained a high degree of utility in the paper coating field because of the fact that, except where highly refined, the protein contains toxic ingredients as well as allergy producing materials, or allergens.

To remove both of these harmful ingredients has heretofore necessitated drastic refinement with consequent increased cost and greatly reduced yield of useable product. Accordingly, processes such as disclosed in the patent to Saunders 2,547,980 dated April 10, 1951, are utilized to produce a detoxified, deallergenated protein from castor pomace, although in this patent, the allergens are removed from the composition.

It is a principal object of this invention, therefore, to provide a paper coating composition made from castor pomace which is non-toxic and non-allergic reacting by a simplified and thus less costly procedure, and which process provides a novel, useable, safe product in substantially greater yields than heretofore available.

It is another object of this invention to provide an emulsion type paint containing a normally toxic and allergy reacting protein which paint is non-toxic and shows no allergy producing activity.

Other objects of the invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been discovered that a non-toxic, non-allergic castor bean protein paper coating composition can be made without the necessity of removing any portion of the reaction mass prior to adding the pigment slip, a step heretofore considered necessary to obtain a safe product from castor pomace.

Broadly stated, this invention comprises a process for producing a coating composition from castor pomace which is non-toxic and shows substantially no allergy reaction in humans which comprises treating a toxin and allergen-containing pomace with an aqueous alkali metal hydroxide solution in the presence of a minor amount of a resin acid or salt of a resin acid, e. g., tall oil, at a pH of from 9.5 to 11, at a temperature of from 60 to 80° C. until a smooth dispersion is obtained, and, without precipitating the protein as by adding an acid to reduce the pH to below 7, or to the isoelectric point, adding a pigment slip. This invention also comprises the product produced in accordance with the process as outlined above.

The preferred process of this invention contemplates at least five steps. As the first operation, castor pomace, for example, is suspended in water. Under ordinary circumstances, this pomace will contain from 1% to 3% oil and some solvent. It is preferred, however, for best color properties that the pomace contain no more than 1% oil, and that it shall have undergone a desolventizing procedure, such as that disclosed in Saunders Patent 2,502,484 to render the pomace substantially solvent-free.

The next step is the addition of a resin acid such as tall oil, or an equivalent amount based on available acid of resin acids, abietic acid, hydrogenated abietic acid, alkali metal salts of such acids, or equivalent materials such as the alkali metal sulphonates of such acids. For most purposes, from 15 to 50 parts of tall oil or other acid or salts such as mentioned above are employed per 100 parts of seed pomace.

After the foregoing ingredients are thoroughly mixed, an aqueous solution of alkali hydroxide, such as sodium or potassium hydroxide is added at a slow rate until a pH of from 9.5 to 11 is obtained. Ordinarily, a 10% aqueous caustic solution is employed for this purpose although this concentration is not critical. Sodium hydroxide is ordinarily used, although other alkali hydroxides, e. g., KOH and LiOH might also be employed.

When the proper pH is reached, the mass is heated to between 60 and 80° C. and held at that range until a smooth dispersion is obtained. At this point, the toxic components are believed to be destroyed, but the material still shows allergen reactivity.

The final step is the addition of a pigment slip, which pigment slip may be a white clay, such as kaolin, or the slip may be colored by the addition of a suitable pigment or dye. Water may then be added or removed as may be required for a suitable coating consistency. At this point, the freshly prepared product shows substantially no allergen activity when tested on the skin of a human being extremely sensitive to the castor allergens. The area of application reddened slightly, but there was no evidence of the usual welt that forms. Dried coatings so produced show substantially no allergen activity and are non-toxic.

It will also be observed that the compositions which are to be used as paper coatings may be spray-vacuum dried, for example, and powdered, and then prior to use in the coating operation, re-dispersed in an aqueous medium, desirably with the aid of a wetting or dispersing agent. Although the protein composition appears to have been rendered substantially entirely non-allergy producing upon the addition of a chemically inert water insoluble material in finely divided state (i. e., from less than 2 microns to 100 microns in size) drying seems to aid in completing the deallergenation, or inhibition of allergen activity.

The compositions of this invention are readily distinguished from protein coating compositions of the prior art in that in each known instance, the allergen material being solubilized in an alkaline solution is decanted and washed free from the precipitated protein. This protein is then re-dispersed in alkali and processed to yield a paper coating composition. These steps are avoided in the present invention. No material is removed from the composition mix unless it be water. It would be expected that unless the allergen material were removed or destroyed it would appear in the final product. However, this was not found to be the case. Reaction conditions in preparing the compositions are not sufficient to destroy the activity of the allergen material as has been shown by actual tests on rabbits and human beings. Tests on the water solution of alkali modified castor protein precipitated with acid have given positive allergen reactions even when such drastic refinement as a pH of 12 has been used. When the decorticated castor bean solids are leached with water, the residue will show only a mild reaction indicating the water solubility of the allergens. Tests for the presence of the allergen were carried out on rabbits and a human being extremely sensitive to the whole castor protein. The tests on rabbits were made by intracutaneous injection of a saline solution of the solids of the coating, said solution being produced by suspending 200 mg. of the coating solids in 10 cc. of a 1% sodium chloride solution. $\frac{1}{10}$ of a millimeter of the suspension was injected into the skin of rabbits using an intradermal injection syringe. The liquid introduced created a bump under the skin and was plainly visible. No other reactions were observed. Observations of the point of injection were made at the end of 18 hours, 52 hours, and 64 hours. There was no observable difference between the site of injection of the saline solution made from castor protein coating material by the process of this invention when compared with like injections made from casein and corn protein. As further checks, the test rabbits were subsequently again injected with a saline solution containing the suspended coating solids. No unusual or gross symptoms resulted, or was there any evidence of anaphylaxis such as that observable when the animals have been sensitized by the initial injections. As a final check on the foregoing negative reactions to the presence of the allergen, a person who is highly susceptible to castor protein was treated. Scrapings of the dried coatings were suspended in water and the suspension applied to the skin. No observable allergic reaction occurred. Also, dry dust made from the coating did not cause sneezing or any of the other symptoms produced by the whole protein. Positive reactions were induced when the person was subjected to treatment by either a water suspension or the dust of the original castor protein material.

The theory of why the allergen material is thus inactivated is not clearly understood although it is believed that there is possibly a combination of adsorption on the finely divided chemically inert ingredient accompanied by encasement of the adsorbed allergen by the balance of the protein. The presence of the organic acidic material or its alkali salt as may be formed in the alkali treatment, may serve as an additional binder for the allergen material, thereby rendering it inactive. It is to be noted, however, that there is no step in the process of this invention whereby the allergen-containing portion of the batch is removed.

It becomes convenient at this point to illustrate the process of this invention by specific example. The following examples are for illustrative purposes only and are not to be construed as limiting the invention to the precise materials or conditions stated therein since variations from the conditions stated may be made well within the skill of the art without substantial departure from the principle of this invention.

EXAMPLE I

*Paper coating composition*

150 parts of decorticated castor bean solids having a nitrogen content of 10.5% are suspended in 850 parts of water containing 45 parts of tall oil. Sufficient caustic soda was added in increments to bring the pH of the mixture to 10.5 while heating to a temperature of 60° C. The amount of caustic soda required in this case was 9.6 parts on the dry basis. The protein became completely dispersed and of smooth consistency and was used directly to prepare a clay coating for paper. This clay coating is prepared by mixing 300 parts of China clay with 900 parts of water containing 0.2 to 0.5 part of caustic soda, and adding 300 parts of the unprecipitated castor protein dispersion as made up above. After screening, the coating was applied to paper by a conventional means. The resulting coating adhered well to paper giving a standard wax pick of 6 to 7. A portion of the coating was scraped off the paper and used to prepare saline solutions for determining allergen activity. Negative allergen reactions resulted whereas similar saline solutions prepared from the castor protein used in producing the dispersions reacted positively.

EXAMPLE II

*Emulsion type paint*

80 parts of decorticated castor bean solids were suspended in 346 parts of water, with 7 parts of Nacconal (a sodium alkyl aryl sulphonate) and the materials mixed for 15–20 minutes. 40 parts of tall oil were then added. 30 parts of a 16% aqueous NaOH solution were then added and the mixture heated to 60° C. The pH was then adjusted to 10.5 by addition of a suitable amount of caustic soda as an aqueous solution and the reaction continued until a smooth dispersion was obtained. The amount of caustic soda used in this example was 7.3 parts on the dry basis.

The foregoing dispersion of castor protein was then added to an appropriate mixture of pigmenting materials, preservatives, and varnish. These consisted of the following:

| | Parts |
|---|---|
| Sodium o-phenylphenate | 2.5 |
| Sodium pentachlorophenate | 2.5 |
| Borax | 4 |
| Tributyl phosphate | 5 |
| Lithopone | 150 |
| TiO$_2$ | 145 |
| Asbestine | 75 |
| Calcium carbonate | 100 |
| Silica | 100 |
| Trisodium phosphate | 2 |
| Water | 600 |
| Mica | 75 |
| Drier | 5 |
| Ammonia | 1.9 |
| Tall oil | 20.5 |
| Varnish | 94 |

After thorough mixing, the foregoing produced a satisfactory paint base, which was diluted 1:1 with water before application.

Upon testing the powdered dried film for allergy reactions using the test procedure given above for paper coatings, negative results were obtained.

From the foregoing examples, it will be observed that in general this reaction is desirably carried out at a pH of about 10.5. Higher pH's e. g., above 11.0, in the temperature range employed herein yield products subject to decomposition, molding and loss of binding properties. Lower pH's e. g., below 9.5, within the temperature ranges employed in this invention yield products in which there has been a failure to substantially detoxify the protein. It is preferred to conduct the process of this invention in a temperature range of from 60° C. to 80° C. at a pH of from 9.5 to 11.0, and for a period of time sufficient to produce a smooth dispersion. The amount of rosin acid or salt, including the equivalent materials mentioned above, is generally from 2 to 10 parts of such resin material per 100 parts of protein-water suspension. Based on the dry pomace, from 15 to 50 parts of the resin material may be used.

While the examples of this invention are limited to castor bean protein, the same procedure may be applied to other seed proteins which are characterized by the same difficulties as castor protein in that they contain both toxic and allergen ingredients. Specific examples of such other protein materials include cottonseed protein, flaxseed protein, and the like.

By the term "resin acid material" as used herein and in the appended claims, it is intended that this term be generic to rosin acids in the crude or refined state, abietic acid, hydrogenated abietic acid, sulphonated abietic acid, sulphonated rosin acids, sulphonated hydrogenated abietic acids, sulphonated tall oil, and the alkali metal salts of these acidic materials. By the term "pigment slip" as used herein and in the appended claims is intended white or colored slips produced by suspending finely divided chemically inert, water insoluble filler such as kaolin, China clay, or other water insoluble oxide, e. g., zinc oxide, barium oxide, calcium oxide, titanium dioxide, etc., sulphate, e. g., lead sulphate, leaded-zinc oxide, barium sulphate, etc., or silicate, e. g., the various insoluble aluminum silicate clays, silica, etc. or mixtures thereof, in an aqueous medium with or without the addition of a dye or other colorant material, e. g., copper phthalocyanine, carbon black, chrome yellow, etc. Other ingredients used as fillers, preservatives, varnishes, etc. may also be included in the "pigment slip." With proper modification known to the art, the compositions of this invention are useful in inks, protective colloids, preparation of emulsion type paints, box-board coatings, or fabric coatings.

By the term "chemically inert" as used herein and in the appended claims, it is meant that the so described material will not be substantially reactive in the environment where employed.

Other modes of applying the principle of this invention may be employed instead of those specifically set forth above, changes being made as regards the details herein disclosed, provided the elements set forth in any of the following claims, or the equivalent of such be employed.

I claim:

1. A process for producing a non-toxic, substantially entirely deallergenated protein composition which comprises treating a toxin and allergen-containing seed pomace with an alkali metal hydroxide in the presence of a minor amount based on the dry pomace of a resin acid material at a pH of from 9.5 to 11, at a temperature of from 60° C. to 80° C., until a smooth dispersion is obtained, and, without precipitating the protein, adding a pigment slip comprising a finely divided chemically inert water insoluble filler.

2. A process in accordance with claim 1 in which the alkali metal hydroxide is sodium hydroxide.

3. A process in accordance with claim 1 in which the resin acid material is tall oil.

4. A process for producing a non-toxic, substantially entirely deallergenated castor protein composition which comprises treating an aqueous suspension of the toxin and allergen-containing castor pomace with an alkali metal hydroxide in the presence of from 20 to 50 parts of a resin acid material per 100 parts of castor pomace, at a pH of from 9.5 to 11, at a temperature of from 60° C. to 80° C. until a smooth dispersion is obtained, and, without precipitating the protein, adding a pigment slip comprising a finely divided chemically inert water insoluble filler.

5. A process for producing a non-toxic, substantially entirely deallergenated castor protein composition which comprises treating an aqueous suspension of the toxin and allergen-containing castor pomace with aqueous sodium hydroxide in the presence of from 20 to 50 parts of tall oil per 100 parts of castor pomace, at a pH of from 9.5 to 11, at a temperature of from 60° C. to 80° C., until a smooth dispersion is obtained, and, without precipitating the protein, adding an aqueous dispersion of a finely divided kaolinitic clay.

6. The product produced by the process of claim 1.
7. The product produced by the process of claim 4.
8. The product produced by the process of claim 5.

References Cited in the file of this patent

UNITED STATES PATENTS

| | | |
|---|---|---|
| 1,955,375 | Cone et al. | Apr. 17, 1934 |
| 2,006,229 | Cone et al. | June 25, 1935 |
| 2,116,768 | Rowland | May 10, 1938 |
| 2,127,298 | Isaacs | Aug. 16, 1938 |
| 2,370,268 | Stewart | Feb. 27, 1945 |
| 2,392,302 | Baker et al. | Jan. 8, 1946 |
| 2,547,980 | Saunders | Apr. 10, 1951 |
| 2,566,529 | Montgomerie | Sept. 4, 1951 |
| 2,636,829 | Smith et al. | Apr. 28, 1953 |

FOREIGN PATENTS

| | | |
|---|---|---|
| 584,394 | Great Britain | Jan. 14, 1947 |